United States Patent [19]
Haas et al.

[11] Patent Number: 6,032,348
[45] Date of Patent: *Mar. 7, 2000

[54] METHOD OF FORMING A MODULARIZED ADJUSTABLE HOLDING FIXTURE

[75] Inventors: Edwin Gerard Haas, Sayville; Edward Valentine Sullivan, Huntington Station; Robert Charles Schwarz, Huntington; John M. Papazian, Great Neck, all of N.Y.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/044,816

[22] Filed: Mar. 20, 1998

[51] Int. Cl.$^7$ .................................................. B23Q 17/00
[52] U.S. Cl. .............................. 29/434; 29/464; 29/469; 29/281.4; 29/281.5; 269/266
[58] Field of Search .............................. 29/469, 434, 464, 29/407.05, 407.09, 407.1, 721, 281.4, 281.1, 281.5; 269/266, 309, 310, 900, 296, 329

[56] References Cited

U.S. PATENT DOCUMENTS

| | | |
|---|---|---|
| 3,559,980 | 2/1971 | Terai et al. . |
| 4,047,709 | 9/1977 | Thyberg et al. . |
| 4,088,312 | 5/1978 | Frosch et al. . |
| 4,200,272 | 4/1980 | Godding .................................. 269/26 |
| 4,684,113 | 8/1987 | Douglas et al. . |
| 4,723,766 | 2/1988 | Beeding . |
| 4,821,393 | 4/1989 | Spigarelli ................................. 29/283 |
| 4,936,560 | 6/1990 | Barozzi .................................. 269/266 |
| 5,092,028 | 3/1992 | Harnden ................................. 29/709 |
| 5,121,907 | 6/1992 | Engwall .................................. 269/21 |
| 5,163,793 | 11/1992 | Martinez . |
| 5,201,502 | 4/1993 | Scheider . |
| 5,215,297 | 6/1993 | Sato et al. . |
| 5,364,083 | 11/1994 | Ross et al. . |
| 5,372,357 | 12/1994 | Blaimschein . |
| 5,546,784 | 8/1996 | Haas et al. . |
| 5,590,870 | 1/1997 | Goellner . |
| 5,722,646 | 3/1998 | Soderberg et al. . |

OTHER PUBLICATIONS

Kurtz, Developing a flexible automated fixturing device, ISSN: 00256501, Jul. 1994.
Fixturing flexibility with pogo sticks, ISSN: 03610853, Nov. 1995.
Bijan, Issues in the design of the reconfigurable fixture modules for robotic assembly, ISSN: 02786125, 1993.
Nordeen, Build a modular flexible fixturing system for weldments, ISSN: 00432296, Mar. 1995.

*Primary Examiner*—David P. Bryant
*Attorney, Agent, or Firm*—Terry J. Anderson; Karl J. Hoch, Jr.

[57] ABSTRACT

The invention resides in a method of forming an adjustable holding fixture comprising the steps of providing a frame, providing a plurality of elongated beam modules each containing a plurality of translating members which are arranged at uniformed spacing between one another on each beam module and connecting said plurality of elongated beam modules with one another on said frame to combine the effect of each module into a single fixture.

16 Claims, 5 Drawing Sheets

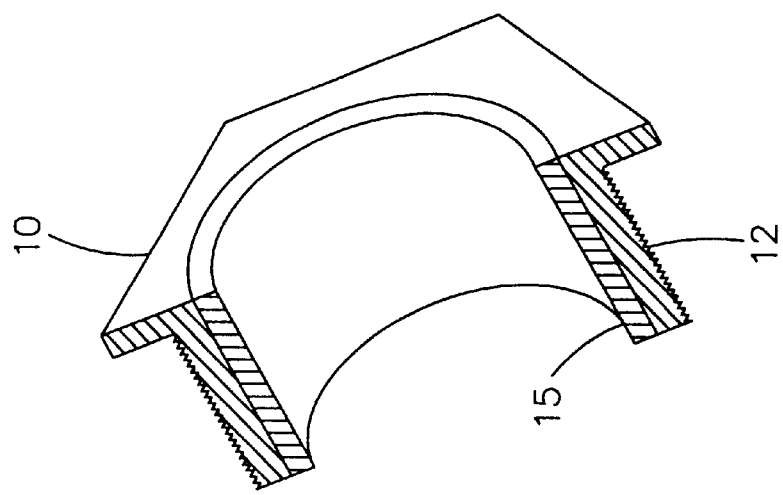
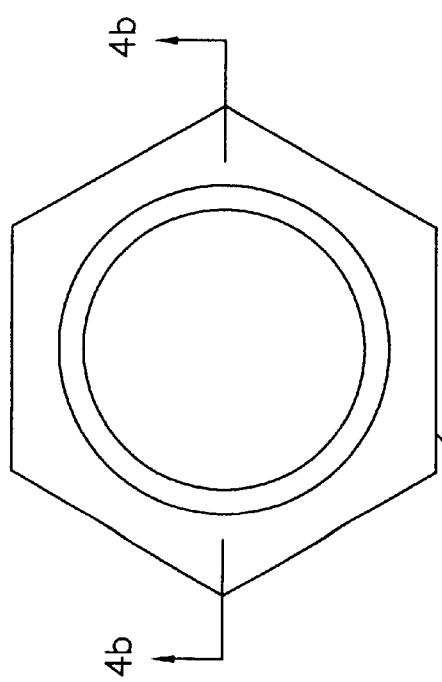
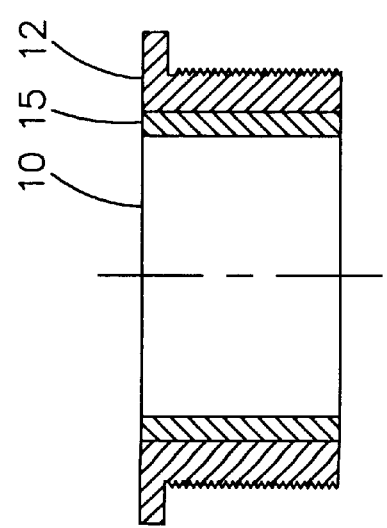

METHOD OF FORMING A MODULARIZED ADJUSTABLE HOLDING FIXTURE

This application relates to copending U.S. Application Ser. No. 08/921,823 entitled "MODULARIZED PARALLEL DRIVER TRAIN" filed Sep. 2, 1997, and to copending U.S. application Ser. No. 08/903,476 entitled "INDIVIDUAL MOTOR PIN MODULE" filed Jul. 30, 1997.

BACKGROUND OF THE INVENTION

The invention resides in an assembly for a holding fixture, and relates more particularly to a "building block" approach of using many similar or identical modular I-beam assemblies comprised minimally of two rows or columns of individual, replaceable linear motion subassemblies to create a larger holding fixture which utilizes an array of translating members.

Holding fixtures are used to retain contoured parts for inspection and/or fabrication purposes and can often be difficult to assemble and maintain without using a modular assembly approach as described by this invention. Many types of linear motion (translating) devices are commercially available and are applicable to the construction method described by this invention. For reference, a lead screw-type approach is shown in the enclosed figures. U.S. Pat. No. 4,684,113 issued to Douglas and Ozer details a universal holding fixture. Such large discrete contour tools are composed of an array of translating members and encounter problems in assembly, wiring, tolerance build-up, repair and servicing.

Additionally, the cost and risk involved with machining large tooling plates and housings from large material stock increases with the number of translating members. In previous holding fixtures, large, costly machine tools must be used to machine these large plates and the versatility to change (expand or contract) the plan form (active area) of the holding fixture is limited by the fixed base and/or intermediate mounting plate size. Higher tool costs result from the larger expenditures and handling costs required to buy dimensionally larger metal stock and subsequently assemble and wire a large, difficult-to-handle fixture. Large holding fixtures need to take advantage of the concept of "modularity". This is because large holding fixtures traditionally have had a pre-set maximum active tool area (maximum usable length and width). Only the individual holding members needed were activated. Nonmodular holding fixtures therefore had to be purchased with inflexible plan forms (overall length and width). Furthermore, troubleshooting, servicing, maintaining, repair and replacement tasks are also difficult to accomplish when fabricating tools in the prior art manner. Additionally, off-line repairs, servicing, and maintenance were slower in prior art designs. By contrast, minimum down-time by rapidly replacing modularized components with acceptable spare modules and/or subassemblies is desired.

The present invention thus takes a "building block" approach and makes use of smaller, low-cost, repetitive elements (e.g. all of the subcomponents of the I-beam assembly), the smaller parts can be manufactured using low-cost, high volume techniques. Assembly, previously a chore due to the difficult access available when building large fixtures, becomes much faster and easier when using an array of modular I-beam assemblies. The use of many similar or identical modular I-beam assemblies within an adjustable frame so that the plan form (active length X width) can be adjusted according to particular needs is new and unobvious. As proposed by the present invention, such use of many similar or identical modular I-beam assemblies which can be rapidly located and installed into an outer frame provides for smaller, pre-tested and pre-assembled units which can be assembled/disassembled, maintained, repaired and stored off-line as needed. Thus, the invention details a modularized approach for building large adjustable holding fixtures.

An object of the invention is to provide an inexpensive means for producing self-adjusting holding fixtures which can be pre-programmed to adjust themselves to three dimensional contours, and can recall or adjust the three dimensional contours from data stored within computer memory.

A further object of the invention is to provide an assembly whereby lower overall assembly and machining costs are major advantages to building large holding fixtures.

Still a further object of the invention is to provide an assembly of the aforementioned type wherein high volume, high production machining techniques can be used with inherently lower machining risk.

A further object of the invention is to provide a plurality of modularized adjustable holding fixture building blocks put together, thereby lowering the overall cost of the assembly by simplifying wiring, assembly, and machining operations.

Yet still a further object of the invention is to provide an assembly with inherently lower overall risk associated with manufacturing thus lowering the overall cost by reducing the magnitude of errors which can cause scrap when using this building block approach to creating larger-scale tooling.

A further object of the invention is to provide an assembly of the aforementioned type which lends itself to easier servicing, faster component replacement, and less down time.

Still yet a further object of the invention is to provide individual I-beam modules which can be designed so that each requires a minimal quantity of electrical connections in particular when using distributed control system logic and utilizing quick-disconnect electrical plugs and locating devices for rapid indexing and installation so that module removal and replacement can be accomplished with minimum down time.

Still a further object of the invention is to provide individual module repair, testing, and/or service which can then take place off-line and to offer a user greater versatility by allowing overall tool size changes inexpensively.

Yet another object of the invention is to provide a device having an overall plan form (length and width) dimensions which can be changed using building block units for larger holding fixtures such that modules can easily be added or subtracted within the limitations imposed by the overall tooling frame.

SUMMARY OF THE INVENTION

The invention resides in a method of forming an adjustable holding fixture comprising the steps of providing a frame, providing a plurality of elongated beam modules each containing a plurality of translating members which are arranged at uniformed spacing between one another on each beam module and connecting said plurality of elongated beam modules with one another on said frame to combine the effects of each module into a single fixture.

BRIEF DESCRIPTION OF THE DRAWINGS

FIGS. 4a, 4b and 4c show top, sectional, and isometric breakaway views, respectively, of an upper guide assembly for a translating member.

DETAILED DESCRIPTION OF THE PREFERRED EMBODIMENT

This invention describes a method of building a large adjustable holding fixture 1 by using a modularized, I-beam building-block approach.

Figure 1:
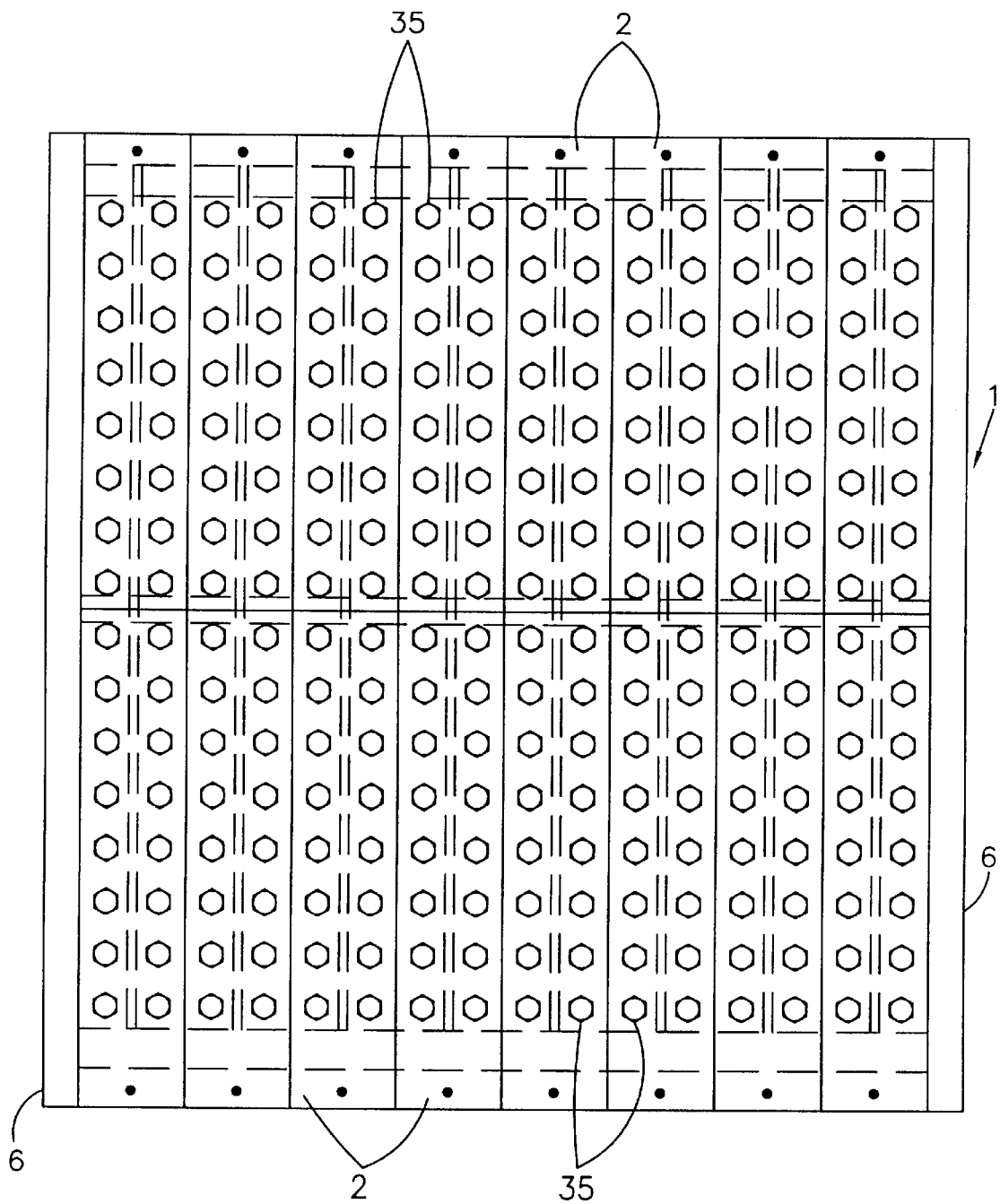
FIG. 1 shows a plan view of an adjustable holding fixture which is built up using sixteen beam modules, each inserted into a tooling frame.
Figure 2:
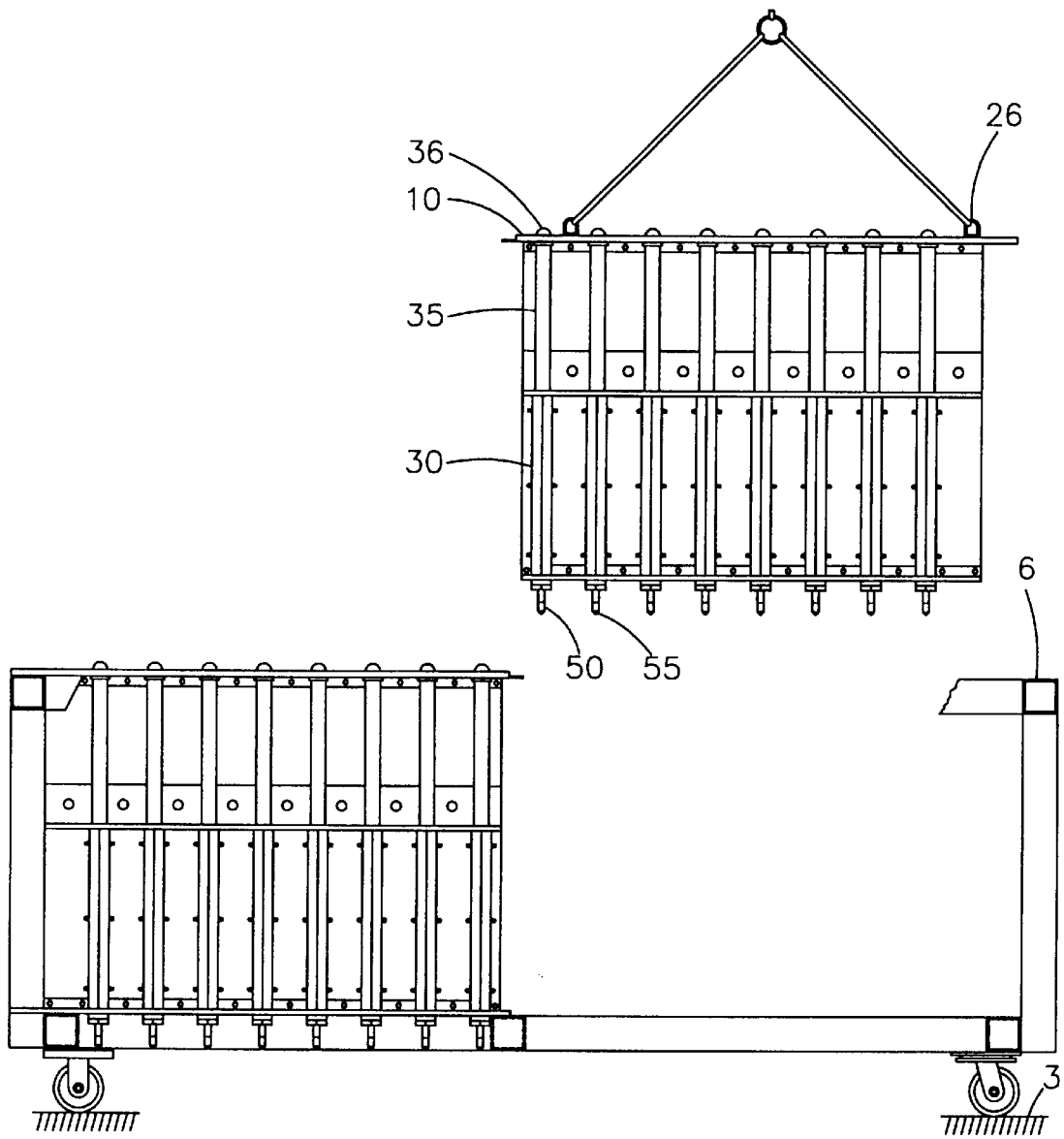
FIG. 2 is a partially fragmentary view showing a tooling frame with one I-beam module already inserted into the tooling frame and one being lowered into position.

Referring to FIGS. 1 and 2, it should be seen that each fixture 1 is formed by adding (or subtracting) common I-beam modules 2 containing a smaller quantity of evenly-spaced parallel translating members 35, a versatile holding fixture can be built which offers many advantages over a holding fixture with non-modular construction.

The fixture has a footprint defined by a frame 6 which has a length and width dimensions which are custom to the application at hand. The frame 2 of the fixture is the base upon which the modules 2 are mounted. The frame 6 rest on a support surface 3 as seen in FIG. 2. Note that the frame 6 is preferably adjustable within the limitations of the desired range of use. The framing members which comprise the holding fixture can be changed to accommodate different plan forms if the cost of the framing members is low enough relative to the cost of making an adjustable frame for the desired range of use.

Figure 3:
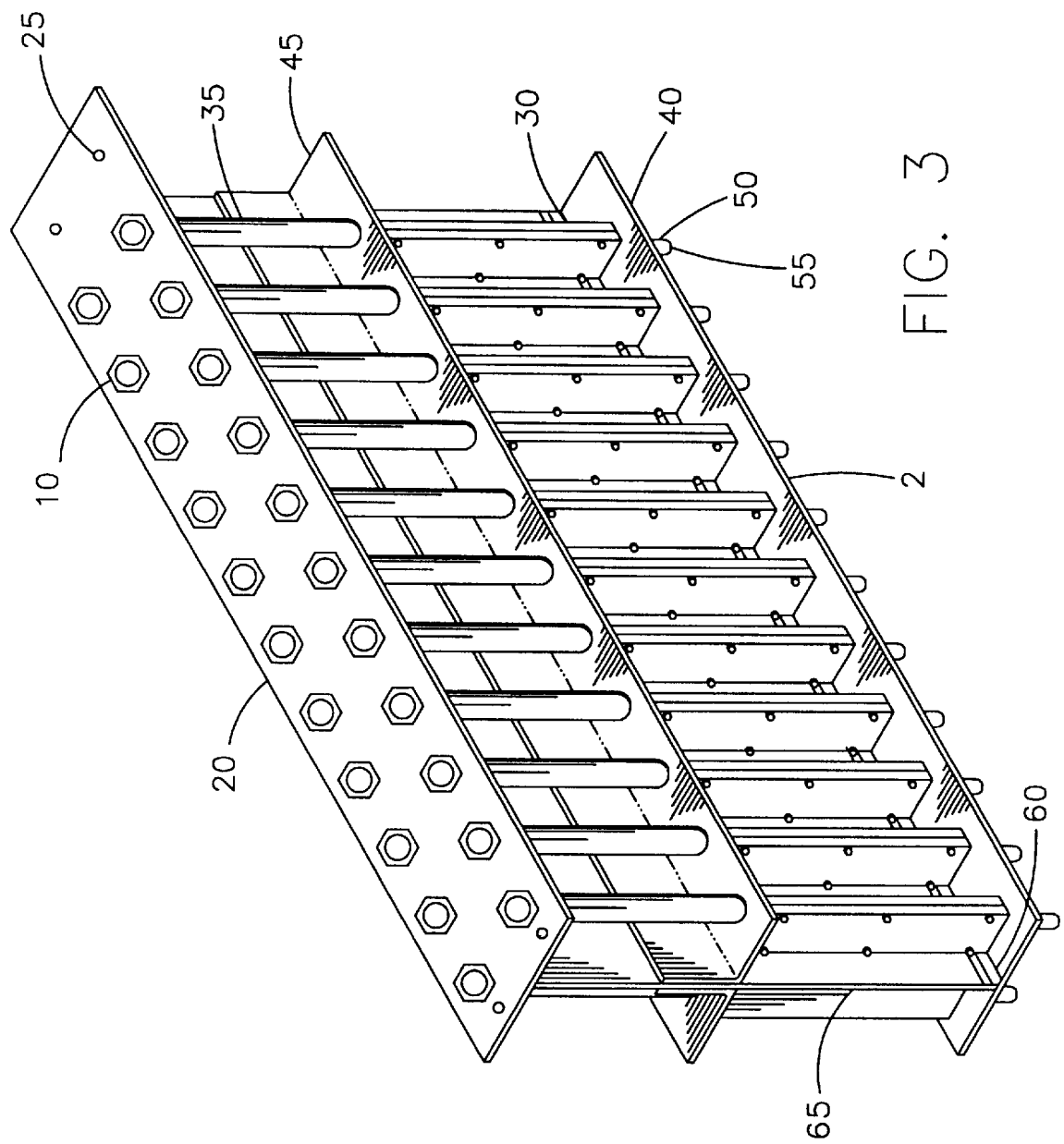
FIG. 3 shows an isometric view of a single I-beam module, excluding wiring and control system components.

FIG. 3 shows a module 2 which includes provisions for linking an array of such modules together to construct the larger holding fixture 1. In the preferred embodiment, each module has a single I-beam shape (see FIG. 3). The I-beam shape is defined by a plurality of upper guide assemblies 10 which are retained by an upper flange 20 of the modularized I-beam module 2. Two intermediate supports 45 connect to the I-beam web 65 at inner sides thereof and on the outer sides thereof retain lower guide assemblies 30, the plurality of translating members 35, and a lower flange 40. The lower flange 40 also retains the lower end of the lower guide assembly 30 and drive motors 50, which are preferably servo motors, but can be any device which can controllably impart rotary motion.

Figure 5:
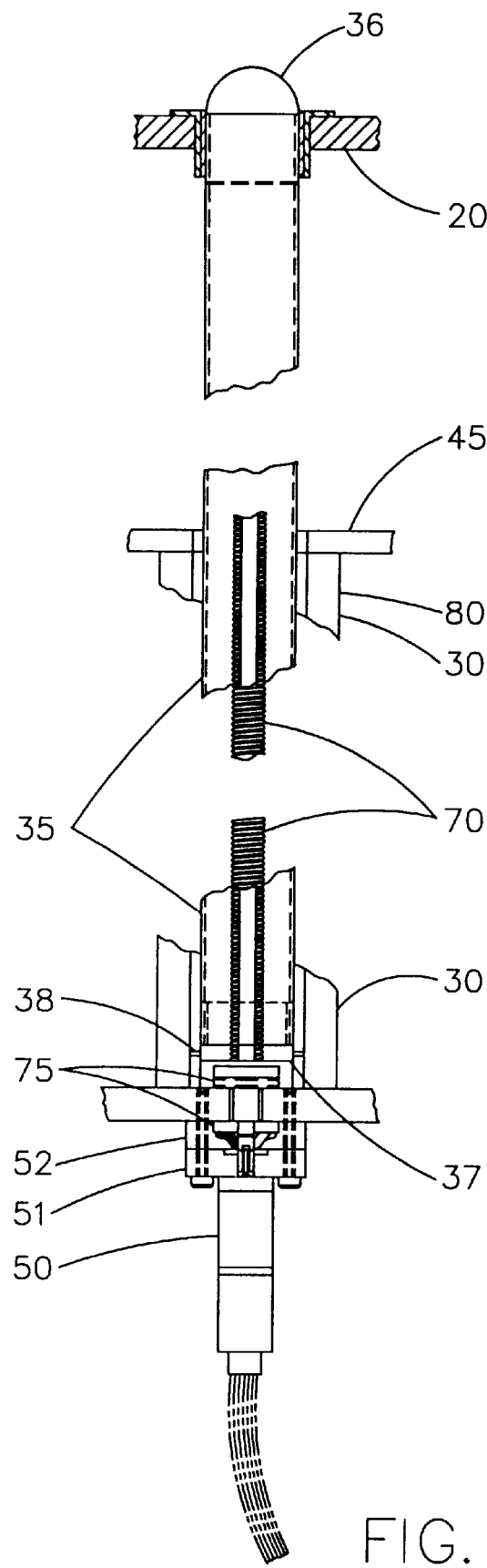
FIG. 5 shows a partial breakaway view of the preferred embodiment of a single translating member assembly, separated at intervals due to the length of each member.

The I-beam web 65 and the upper and lower flanges 20 and 40 respectively can be connected together with brackets 60 or by welding to form the structure of the I-beam. Optionally, positional encoders 55 can be used with the motors 50 to provide closed-loop positional control, or, in one alternate embodiment, stepper motors can be used in place of the servo-type motors 50 as shown in FIGS. 2 and 3. As illustrated in FIG. 5, each of the translating members 35 is part of a translating member assembly 80 which provides distinct points of displacement along the fixture 1. In the embodiment shown in FIG. 5, these assemblies are lead-screw type mechanisms, but in other embodiments, hydraulic, pneumatic, or other types of commercial linear actuators may be used in the modularized I-beam assembly 2 in place of the lead screw translating member assembly 80. Notwithstanding, in the preferred embodiment, the translating member assembly 80 consists of a translating member 35 having a translating member tip 36 at the upper end and a drive nut 37 at the lower end which are installed into a lower guide assembly 30 and driven by a motor 50 via a lead screw 70. The tip 36 is shown as having a hemispherical outer surface, but other shapes and types (e.g. a vacuum chuck) can be used within the scope of the invention.

In the assembly 80, either the drive nut 37 or the translating member 35 has an anti-rotation means 38 attached to it so that rotation of the lead screw 70 imparted by the motor 50 does not allow the translating member 35 to rotate. In the illustrated embodiment of FIG. 5, the means 38 takes the form of two pins shown on the drive nut 37 which ride in pre-machined channels at the parting surfaces of the lower guide assemblies 30. Axial loads are transferred with minimum friction from the lead screw 70 via thrust bearings or bushings 75 to the I-beam structure.

As seen in FIGS. 2 and 3, each module 2 can be inserted into the frame 6 by connecting and indexing both to one another and to the frame assembly 6 using a plurality of locating devices 25. Such locating devices may include many types of pins (diamond, cylindrical, straight and tapered), shoulder or stripper bolts, tooling balls, as well as mating holes and counterbores. The entire assembly 1 can be configured externally, outside of the frame 6, and then lifted into position by either a hoist or other means. Lifting means 26, either removable or permanent, may be included for facilitating assembly into the frame assembly 6 as shown in FIG. 2.

A plurality of modularized I-beam assemblies 1 may be connected both to each other and to the frame 6, forming the large holding fixture, such as shown in FIG. 1. Thus, the individual translating pins or members 4 which are arranged in lines each pin uniformly spaced from one another on each beam, can be placed in groups of two columns each, forming an assembly whose structure resembles an "I-beam" in cross section. The built-up I-beam structure is easily pre-machined and can have provisions for both handling (e.g. lifting eyes) and location or indexing (e.g. pins and/or pin holes). The completed I-beam assembly can then easily be installed as a unit into a frame, allowing assembly, disassembly, and maintenance operations to be performed quickly.

Referring now to FIGS. 1 and FIGS. 4a–4c, it should be seen that the surface of the upper flange 20 of the module 4 includes a plurality of guide assemblies which are secured within openings formed in the upper flange 20. As seen in FIGS. 4a–4c, each guide has a hexagonal perimeter which can be seen protruding from the upper flange 20 or plate of the modules 4. The upper guide assembly 10 shown in FIGS. 4a–4c is comprised of an upper guide housing 12 having a threaded outer surface which threads with a securement bolt or the like and has an upper guide bushing or bearing 15 whose inner surface closely fits the outer surface of the translating member 35. Other geometric shapes may be used for the outer perimeter of the upper guide housing 12 other than hexagonal, if desired.

Using the modularized adjustable holding fixture building-block approach to fabricate holding fixtures enables many tooling fixtures to become more cost-effective including adjustable checking fixtures, adjustable contour fixtures, adjustable inspection fixtures, and many other types of adjustable holding fixtures. These discrete, adjustable tools have many applications in the aerospace industry. Other industries that need to hold, inspect or measure contoured components can benefit from the described "modular" approach as well. The modular approach can be used to translate a series of gauges or sensors for rapidly checking the surface(s) of a contoured part or component at discrete locations. The digitized data can be directly stored in computer memory for a three-dimensional surface description or a comparison to previously stored data which can be made using many computer, computer-graphic or numerical control software applications. In an adjustable holding fixture application, the modularized adjustable holding fixture adds many benefits beyond the inherent lower fabrication costs. It adds the ability to isolate and rapidly replace malfunctioning elements by replacing entire modules with stocked spare modules. Further repairs can then be implemented off-line. This minimizes down time, operational, and replacement costs. Furthermore, the ability to reconfigure the plan form of an entire holding fixture by adding or subtracting modules gives a high degree of versatility to the fixture 1.

As previously discussed, the holding fixture frame 6 is preferably made adjustable or can utilize replaceable framing members in order to change plan form size. This will accommodate the addition or deletion of rows or columns of modules. The added cost for implementing such a plan form versatility is significantly much lower than the cost for purchasing entirely new tools with different plan forms.

In summary, the modularized adjustable holding fixture methodology provides a "building block" approach to fabricate discrete tooling which not only reduces cost, but makes large assemblies consisting of many rows of parallel shafts feasible with respect to cost, tolerance build-up, wiring, assembly, and machining processes. The individual I-beam modules can be assembled one-at-a-time, each having almost unlimited access to all subcomponents. Wiring for holding fixture control systems was formerly more difficult; the holding fixtures often had many electrical connections and grouped many wires together into very confined spaces. This approach also permits employing a distributed control system logic which further helps alleviate the problem of handling large quantities of wires in limited space. When using distributed logic, control circuitry can be placed into each module, thus minimizing the amount of external wiring connections needed. The methodology thus allows for fast repair and replacement using standard, stocked parts and pretested subassemblies to maximize operational availability.

Accordingly, the invention has been described by way of illustration rather than limitation.

What is claimed is:

1. A method of forming an adjustable holding fixture comprising the steps of:
   providing an adjustable frame configured to stand above a support surface;
   standing said frame on said support surface;
   providing a plurality of elongated beam modules each having a given length and each containing a plurality of translating members which are arranged at uniformed spacing between one another on each beam module;
   selecting a given number of elongated beam modules to be used in said holding fixture;
   adjusting the size of said frame to accommodate the selected given number of elongated beam modules; and
   connecting said plurality of elongated beam modules to said frame to combine the effects of each module into a single fixture.

2. A method as defined in claim 1 wherein each module has a single I-beam shape defined by a plurality of upper guide assemblies which are retained by an upper flange and two intermediate supports which connect to a web at inner sides thereof.

3. A method as defined in claim 2 wherein said two intermediate supports have outer sides which retain lower guide assemblies, the plurality of translating members, and a lower flange.

4. A method as defined in claim 3 wherein said lower flange also retain the lower end of the lower guide assembly and drive motors.

5. A method as defined in claim 2 wherein the guide assemblies are comprised of an upper guide housing having a threaded outer surface which threads with a securement bolt onto the upper flange, each guide assembly having an upper guide bushing with an inner surface closely fitting an outer surface of the translating member.

6. A method as defined in claim 1 further comprising providing each of said modules with an I-beam construction having a web and upper and lower flanges, and each of said modules having positional encoders and motors providing positional control.

7. A method as defined in claim 6 wherein comprising each of the translating members is part of a translating member assembly which has a lead screw which provides distinct points of displacement along the fixture and each translating member having a translating member tip at the upper end thereof and a drive nut at the lower end thereof.

8. A method as defined in claim 7 wherein one of the drive nut and the translating member has an anti-rotation means attached to it so that rotation of the lead screw imparted by the motor does not allow the translating member to rotate.

9. A method of forming an adjustable holding fixture comprising the steps of:
   providing a frame;
   providing a plurality of elongated beam modules each extending symmetrically along a longitudinal axis thereof and each containing a plurality of translating members which are arranged at uniformed spacing between one another on each beam module coincidentally along the longitudinal axis thereof; and
   connecting said plurality of elongated beam modules with one another on said frame to combine the effects of each module into a single fixture.

10. A method as defined in claim 9 wherein each module has a single I-beam shape defined by a plurality of upper guide assemblies which are retained by an upper flange and two intermediate supports which connect to a web at inner sides thereof.

11. A method as defined in claim 10 wherein said two intermediate supports have outer sides which retain lower guide assemblies, the plurality of translating members, and a lower flange.

12. A method as defined in claim 11 wherein said lower flange also retain the lower end of the lower guide assembly and drive motors.

13. A method as defined in claim 10 wherein the guide assemblies are comprised of an upper guide housing having a threaded outer surface which threads with a securement bolt or the like onto the upper flange, each guide assembly having an upper guide bushing with an inner surface closely fitting an outer surface of the translating member.

14. A method as defined in claim 9 comprising providing each of said modules with an I-beam construction having a web and upper and lower flanges, and each of said modules having positional encoders and motors providing positional control.

15. A method as defined in claim 14 wherein each of the translating members is part of a translating member assembly which has a lead screw which provides distinct points of displacement along the fixture and each translating member having a translating member tip at the upper end thereof and a drive nut at the lower end thereof.

16. A method as defined in claim 15 wherein one of the drive nut and the translating member has an anti-rotation means attached to it so that rotation of the lead screw imparted by the motor does not allow the translating member to rotate.

* * * * *